US012374782B2

(12) United States Patent
Yang et al.

(10) Patent No.: US 12,374,782 B2
(45) Date of Patent: Jul. 29, 2025

(54) ANTENNA AND BASE STATION

(71) Applicant: Huawei Technologies Co., Ltd., Shenzhen (CN)

(72) Inventors: Zhiming Yang, Dongguan (CN); Jianping Li, Dongguan (CN); Runxiao Zhang, Dongguan (CN); Weifeng Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 149 days.

(21) Appl. No.: 18/342,922

(22) Filed: Jun. 28, 2023

(65) Prior Publication Data

US 2023/0344114 A1 Oct. 26, 2023

Related U.S. Application Data

(63) Continuation of application No. PCT/CN2020/141119, filed on Dec. 29, 2020.

(51) Int. Cl.

| | |
|---|---|
| ***H01Q 1/42*** | (2006.01) |
| ***H01Q 1/24*** | (2006.01) |
| ***H01Q 19/10*** | (2006.01) |
| ***H01Q 21/06*** | (2006.01) |

(52) U.S. Cl.
CPC .............. *H01Q 1/246* (2013.01); *H01Q 1/42* (2013.01); *H01Q 19/10* (2013.01); *H01Q 21/061* (2013.01)

(58) Field of Classification Search
CPC ........... H01Q 1/02; H01Q 1/246; H01Q 1/42; H01Q 19/10; H01Q 21/061
See application file for complete search history.

(56) References Cited

U.S. PATENT DOCUMENTS

| | | | | |
|---|---|---|---|---|
| 2018/0254544 A1* | 9/2018 | Lee | ........................ | H01Q 19/10 |
| 2020/0021005 A1 | 1/2020 | Kosaka et al. | | |

FOREIGN PATENT DOCUMENTS

| | | | |
|---|---|---|---|
| CN | 208284642 U | 12/2018 | |
| CN | 107408753 B | 12/2019 | |
| DE | 202009001821 U1 | 4/2009 | |
| DE | 102014011514 A1 | 2/2016 | |
| EP | 3671952 A1 * | 6/2020 | ............ H01Q 1/246 |

* cited by examiner

*Primary Examiner* — Hoang V Nguyen
(74) *Attorney, Agent, or Firm* — Slater Matsil, LLP

(57) ABSTRACT

An antenna includes a reflection plate, a radome, a radiating element, and a feeding network. The reflection plate has a first surface and a second surface, and the first surface is opposite to the second surface. The radome is covered on the reflection plate, the radome and the first surface of the reflection plate constitute an accommodation space. The radiating element is located in the accommodation space, and the radiating element is electrically connected to the feeding network. The feeding network is at least partially disposed on the second surface of the reflection plate.

20 Claims, 8 Drawing Sheets

ANTENNA AND BASE STATION

CROSS-REFERENCE TO RELATED APPLICATIONS

This application is a continuation of International Application No. PCT/CN2020/141119, filed on Dec. 29, 2020, the disclosure of which is hereby incorporated by reference in its entirety.

TECHNICAL FIELD

This application relates to the field of antenna technologies, and in particular, to an antenna and a base station.

BACKGROUND

With the development of the science and technology, an antenna frequency band, an input power, and a port corresponding to a base station antenna feeding system are increasing continuously, which leads to an increasingly high density of integration and layout of the base station antenna feeding system. The risk of overheating of components in the base station antenna feeding system when the components work is also increasing, and overtemperature of the components in an antenna affects service life of the antenna.

Therefore, how to quickly dissipate heat of the antenna becomes an urgent problem to be resolved.

SUMMARY

This application provides an antenna and a base station, to reduce a temperature of a heating component of an antenna, and quickly dissipate heat of the antenna.

According to an aspect, an embodiment of this application provides an antenna, including a reflection plate, a radome, a radiating element, and a feeding network, the reflection plate has a first surface and a second surface that are oppositely disposed, and the radiating element is disposed on the first surface of the reflection plate. The feeding network is at least partially disposed on the second surface of the reflection plate, the feeding network is electrically connected to the radiating element, the radome is covered on the first surface of the reflection plate, and constitutes a closed accommodation space only surrounded by the first surface of the reflection plate, and the radiating element is disposed in the accommodation space. When the antenna works, a part of heat generated by the radiating element may be conducted to an external environment by using the radome, and another part of heat generated by the radiating element may be conducted to the reflection plate, and the reflection plate conducts the heat to the external environment. In addition, the feeding network is at least partially disposed on the second surface of the reflection plate, and part of the feeding network located on the second surface of the reflection plate is exposed to the air. Heat generated by the feeding network may directly perform heat exchange with external air to improve the speed of heat transferred from the feeding network to external air, so that the feeding network does not have a problem of high temperature when working.

It should be noted that, when a part of the feeding network is located in the accommodation space, heat generated by the radiating element located in the accommodation space may also be conducted to a part of the feeding network located in the accommodation space, and conducted by the part to a part of the feeding network exposed to air, to increase the speed of dissipating heat within the accommodation space. In addition, the radome and the reflection plate may be integrally formed, or the radome and the reflection plate are detachably connected.

In some possible embodiments, the reflection plate may be disposed as a metal reflection plate. Because the metal reflection plate is a good conductor of heat, and the second surface of the reflection plate is not covered by the radome, the second surface of the reflection plate is exposed to an outer side of the radome. In this way, heat generated by the radiating element in the accommodation space may be quickly conducted to the reflection plate to prevent heat from accumulating inside the accommodation space, and can effectively improve heat exchange efficiency between the reflection plate and external air, thereby helping to improve heat dissipation efficiency of the radiating element.

In the foregoing embodiments, a plurality of radiating elements are provided, and the plurality of radiating elements may be distributed in the accommodation space in an array. In this case, a plurality of feeding networks may also be provided, and each column of the radiating elements may be correspondingly disposed with one feeding network. Specifically, each column of radiating elements and the reflection plate may be used as an independent array. Each independent array receives or transmits a radio frequency signal through a corresponding feeding network, and frequency of each independent array may be the same or may be different.

In a possible solution, the feeding network may include a housing and a radio frequency transmission line component. The housing serves as a ground of the feeding network and is connected to the second surface of the reflection plate, the housing and the second surface of the reflection plate constitute an accommodation cavity, and the radio frequency transmission line component is disposed in the accommodation cavity. Specifically, the feeding network may include one or two housings, and a radio frequency transmission line component is disposed in each housing. When there are two housings, a connection manner of the radio frequency transmission line component and a metal reflection plate disposed between two housings may be as follows: The radio frequency transmission line component is directly connected to the second surface of the reflection plate, and the radio frequency transmission line component may be perpendicular to the reflection plate. In this case, two housings in two feeding networks corresponding to one column of radiating elements may be disposed at intervals, and housings of feeding networks corresponding to two adjacent columns of radiating elements are also disposed at intervals, so as to a robust contact area between the shells and an external environment is maintained, and a heat dissipation effect of the feeding networks is improved. In addition, the radio frequency transmission line component may be disposed in parallel with the reflection plate. In this case, the radio frequency transmission line component is connected to two housings in two feeding networks corresponding to one column of radiating elements, and the two radio frequency transmission line components are connected to connecting parts of the two housings, and are connected to the reflection plate through the connecting parts. Housings corresponding to two adjacent columns of radiating elements may also be connected to each other. In this way, a contact area between the housing and the external environment may also be increased in a parallel direction to the reflection plate, thereby ensuring the heat dissipation effect of the feeding network.

It should be noted that, the cavity constituted by the housing and the reflection plate may be a closed accommodating cavity or an accommodation cavity with openings at two ends; the shape of the housing may be a rectangle, a hemispherical shape, or the like. In addition, because the housing is directly exposed to the external environment, to ensure a service life of the housing, measures such as oxidation treatment may be performed on an outer surface of the housing, or a protective layer may be sprayed, to improve a corrosion resistance degree of the housing. The housing and the second surface of the reflection plate may be integrally formed; or the housing and the reflection plate may be connected through riveting, screw connection, welding, clamping or the like. This is not specifically limited herein.

In a possible solution, the radome may include a main cover body, a first end cover, and a second end cover. The main cover body, the first end cover, and the second end cover may be integrally formed components, or three single components detachably connected. Specifically, the main cover body, and the first surface, the first end cover, and the second end cover of the reflection plate constitute a closed accommodation space, and the radiating element may be disposed in the accommodation space and connected to the first surface of the reflection plate. Moreover, the first end cover, the second end cover and the main cover body can all extend to one end of the first surface of the reflection plate. A first projecting portion and a second projecting portion are respectively disposed on the second surface of the first end cover facing the reflection plate and the extension part of the second end cover facing the second surface of the reflection plate. The first projecting portion can be configured to cooperate with a first opening of the accommodation cavity, the second projecting portion may be configured to cooperate with a second opening of the accommodation cavity, so as to seal two ends of the accommodation cavity constituted by the housing and the second surface of the reflection plate, thereby ensuring that the radio frequency transmission line component in the accommodation cavity is not corroded by the external environment.

It should be noted that, when the radio frequency transmission line component in the feeding network is perpendicular to the reflection plate, a plurality of first projecting portions on a first end plate are disposed at intervals, and a plurality of second projecting portions on a second end plate are also disposed at intervals. A plurality of housings are disposed between the plurality of first projecting portions and the plurality of second projecting portions; When the radio frequency transmission line component in the feeding network is disposed in parallel with the reflection plate, the plurality of first projecting portions on the first end plate are sequentially connected at intervals to constitute an integral plate, and the plurality of second projecting portions on the second end plate are sequentially connected at intervals to constitute an integral plate. In addition, the main cover body may extend to the second direction of the reflection plate, as long as it does not constitute a closed space with the first projecting portion on the first end plate, the second projecting portion on the second end plate and the second surface of the reflection plate, such that the feeding network on the second surface of the reflection plate can quickly perform heat exchange with the external environment.

In a possible solution, to facilitate the radome to be covered on the first surface of the reflection plate, the reflection plate may include a main board body and a first baffle plate and a second baffle plate disposed on two sides of the main board body, the first baffle plate and the second baffle plate located on the two sides of the main board body may be configured to cooperate and connect to the radome, so as to the radome may cover the first surface of the reflection plate. Specifically, a first boss may be further disposed on an outer side of the first baffle plate, and a second boss may be disposed on an outer side of the second baffle plate. An extension direction of the first boss may be the same as an extension direction of the first baffle plate, or the first boss is divided into a plurality of sections along the extension direction of the first baffle plate. An extension direction of the second boss may be the same as an extension direction of the second baffle plate, or the second boss is divided into a plurality of sections along the extension direction of the second baffle plate. Upper surfaces of the first boss and the second boss may be in contact with the radome to support the radome, so that the radome can be connected to the first baffle plate and the second baffle plate more conveniently.

The main board body has a first surface and a second surface, and the first surface and the second surface of the main board body are the first surface and the second surface of the reflection plate. When the first baffle plate and the second baffle plate are specifically disposed, the first baffle plate and the second baffle plate may be disposed at two sides of the first surface of the main board body, or be disposed at two sides of the second surface of the main board body.

It should be noted that, a plurality of partition boards may be further disposed on the reflection plate, where the plurality of partition boards are located between the first baffle plate and the second baffle plate, and the plurality of partition boards are in the same extension direction as the first baffle plate and/or the second baffle plate. The partition boards are disposed in parallel with the first baffle plate and/or the second baffle plate. At least one column of radiating elements may be disposed between two adjacent partition boards, at least one column of radiating elements may also be disposed between the partition board and the first baffle, and at least one column of radiating elements may also be disposed between the partition board and the second baffle.

In a possible solution, when the reflection plate is specifically disposed, the reflection plate may be disposed in a plurality of shapes, for example: the reflection plate may be disposed in a V-shaped shape; or the reflection plate may be disposed in a W-shaped shape; furthermore, the reflection plate may also be disposed in a U-shaped shape.

In addition, the main board body may include a plurality of sub-board bodies. The plurality of sub-board bodies may be integrally formed, or may be separately disposed. Two adjacent sub-board bodies may be located at different planes, and a radiating element is disposed on one side of the sub-board body that is located in the accommodation space.

In another aspect, this application further provides a base station. The base station includes the antenna in the foregoing technical solution, and further includes a holding pole, a mount, and a signal processing unit. The mount is disposed on the holding pole, the antenna is installed on the holding pole through the mount, and the antenna is connected to the signal processing unit through a feeder. In addition, sealing processing is performed on the connecting parts between the feeder and the antenna and the signal processing unit. When the antenna in the base station works, the antenna does not cause a case that temperature of a local component is too high, so as to improve work efficiency of the base station.

REFERENCE TAG

10—Radome; 11—Main cover body; 12—First end cover; 13—First projecting portion; 14—Second end cover; 101—Roof board; 102—First side plate; 103—Second side plate; 20—Reflection plate; 21—First baffle plate; 22—Second baffle plate; 23—Partition board; 24—First boss; 25—Second boss; 26*a*, 26*b*—Sub-board body; 30—Radiating element; 40—Feeding network; 41—Housing; 42—Radio frequency transmission line component; 401—First part of the feeding network; 402—Second part of the feeding network; 410—Accommodation cavity; 100—Base station; 110—Base station antenna; 120—BTS; 130—Holding pole; 140—Mount.

DETAILED DESCRIPTION OF ILLUSTRATIVE EMBODIMENTS

The base station antenna provided in embodiments of this application may be applied to various communication systems, for example: a 5th generation (5G) communication system or a new radio (NR) system, a 6G communication system, a long term evolution (LTE for short) system, a global system of mobile communication (GSM for short) system, a code division multiple access (CDMA for short) system, a wideband code division multiple access (WCDMA for short) system, a general packet radio service (GPRS for short) system, an LTE time division duplex (TDD for short) system, a universal mobile telecommunications system (UMTS for short), a worldwide interoperability for microwave access (WiMAX for short) communication system or the like, and may also be a communication system of another unlicensed frequency bands, which is not limited.

The following describes the technical solutions in embodiments of this application in detail with reference to the accompanying drawings in embodiments of this application. It should be understood that the described embodiments are merely some rather than all of embodiments of this application.

Figure 1A:
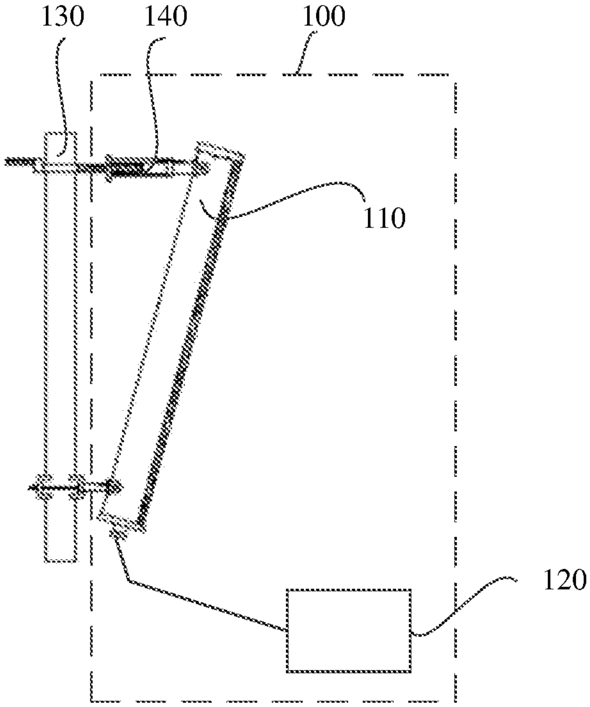
FIG. 1*a* is an example of a schematic diagram of a system architecture to which an embodiment of this application is applicable.

FIG. 1*a* is an example of a schematic diagram of a system architecture to which an embodiment of this application is applicable. As shown in FIG. 1*a*, the system architecture may include a radio access network device, for example, including but not limited to a base station 100 shown in FIG. 1*a*. The radio access network device may be located in a base station subsystem (base station subsystem, BSS), a UMTS terrestrial radio access network (UTRAN), or an evolved universal terrestrial radio access (E-UTRAN), is configured to perform cell coverage of a radio signal, so as to implement connection between a terminal device and a radio network frequency end. Specifically, the base station 100 may be a base transceiver station (BTS) in a GSM or CDMA system, or may be a NodeB (NB) in a WCDMA system, or may be an evolved NodeB (eNB or eNodeB) in an LTE system, or may be a radio controller in a cloud radio access network (CRAN) scenario. Alternatively, the base station 100 may be a relay station, an access point, a vehicle-mounted device, a wearable device, a base station in a future 5G network, a base station in a future evolved PLMN network, or the like, for example, a new radio base station. This is not limited in embodiments of this application.

As shown in a part boxed by a dashed line in FIG. 1*a*, a possible structure of the base station 100 may include a base station antenna 110 and a signal processing unit 120; the signal processing unit 120 includes at least a baseband module. In some other implementations, the signal processing unit 120 may further include a radio frequency module. In addition, FIG. 1*a* further shows an example of a possible deployment scenario of a base station antenna, as shown in FIG. 1*a*, the deployment scenario may include a holding pole 130 and a mount 140. An end of the base station antenna no that is close to a port of the antenna may be fixedly connected to the holding pole 130, and an end of the base station antenna no that is away from the antenna port may be flexibly connected to the holding pole 130 through the mount 140, so that a position of the base station antenna no may be adjusted by the mount 140. It should be understood that FIG. 1*a* shows only a deployment manner of the base station antenna no that includes one antenna. In another scenarios, the base station antenna 110 may also include a plurality of antennas installed around the holding pole 130. Installation positions of the plurality of antennas may be the same or different. When installation positions are different, the plurality of antennas may constitute each different beam coverage areas.

Currently, the base station antenna 110 mainly includes a reflection plate, a feeding network, a radiating element, and a radome. The radome wraps all the reflection plate, the feeding network, and the radiating element, so as to the reflection plate, the feeding network, and the radiating element do not directly contact air outside the antenna. In addition, the radome is generally made of a non-metallic material, but a heat conduction effect of the radome of the non-metallic material is poor, and heat inside the antenna cannot be quickly and well conducted to the outside of the radome, resulting in low heat dissipation efficiency. Therefore, temperature inside the antenna increases at a relatively fast speed. However, temperature of the components wrapped in the radome is high, which affects the performance and service life of the antenna.

The reflection plate may also be referred to as a bottom plate, an antenna panel, or a metal reflection surface. The reflection plate can improve the sensitivity of receiving antenna signals and reflectively concentrate the antenna signals on a receiving point. It enhances the receiving/transmitting capability of the antenna, and blocks and shields the interference of other radio waves from the back (in the opposite direction) to the receiving signals.

It should be noted that, the radiating element may be specifically a sheet metal radiating element, a die casting radiating element, a printed circuit board (Printed Circuit Board, PCB) radiating element, or the like. This is not limited in this application.

Based on the foregoing problems, this application provides an antenna. The following describes the antenna provided in this application in detail with reference to specific drawings and embodiments.

Figure 1B:
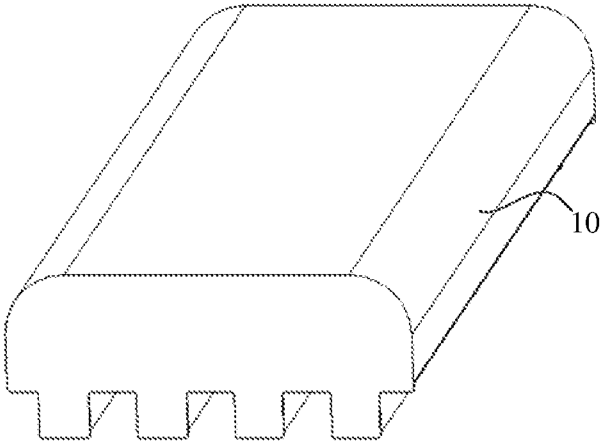
FIG. 1*b* is a schematic structural diagram of a radome as an entirety in an antenna according to an embodiment of this application.
Figure 1C:
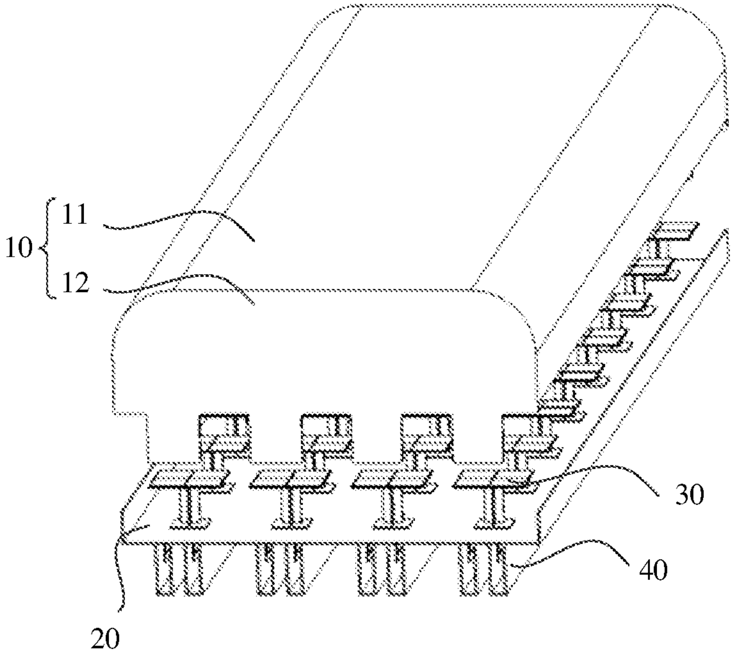
FIG. 1*c* is a schematic structural diagram of separation between a radome and a reflection plate in FIG. 1*b;*
Figure 1D:
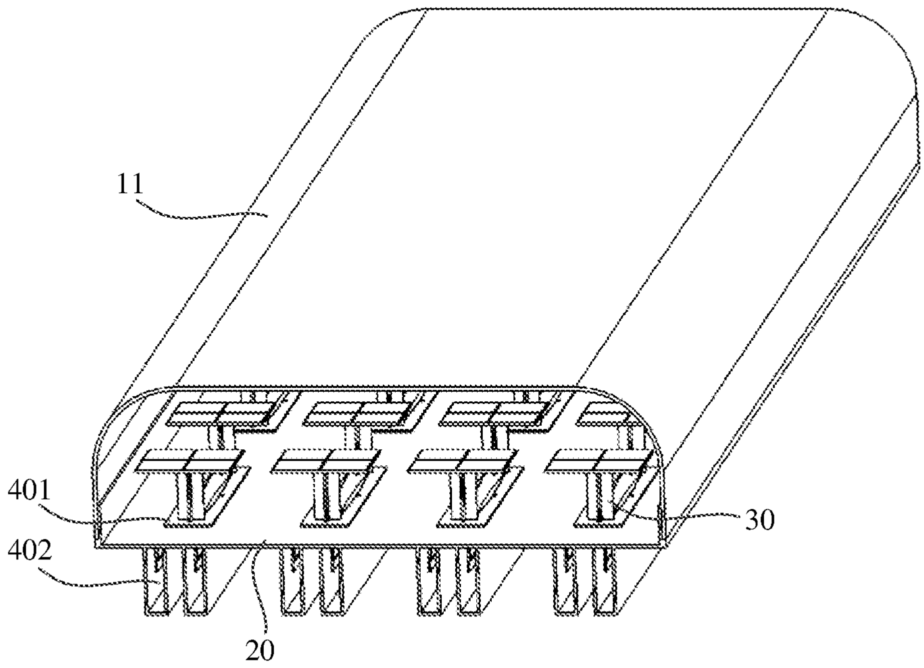
FIG. 1*d* is a schematic structural diagram of a feeding network partially disposed in a radome according to an embodiment of this application.

Refer to FIG. 1*b*, FIG. 1*c*, and FIG. 1*d*, in FIG. 1*d*, a part of a feeding network 40 that is located in the accommodation space is a first part 401 of the feeding network, a part of the feeding network 40 that is disposed on the second surface of a reflection plate 20 is a second part 402 of the feeding network; the antenna includes a radome 10, the reflection plate 20, a radiating element 30, and the feeding network 40; the reflection plate 20 has a first surface (the upper side in FIG. 1*c*) and a second surface opposite to the first surface (the lower side in FIG. 1*c*). The radome 10 and the first surface of the reflection plate 20 constitute a closed accommodation space, and the radiating element 30 is disposed in the closed accommodation space. The feeding network 40 (for example, the second part 402 of the feeding network) is at least partially disposed on the second surface (as shown in FIG. 1*d*) of the reflection plate 20, and the feeding network 40 is electrically connected to the radiating element 30. When the antenna works, a part of heat generated by the radiating element 30 may be radiated to the radome 10, another part of heat generated by the radiating element 30 may be transmitted to the reflection plate 20, and the heat may be dissipated through the radome 10 and the reflection plate 20. In addition, the feeding network 40 is at least partially disposed on the second surface of the reflection plate 20, and part of the feeding network 40 located on the second surface of the reflection plate 20 is exposed to air, and heat generated by the feeding network 40 can be directly exchanged with external air, such that a problem of high temperature does not occur when the feeding network 40 works.

Specifically, when the first part 401 of the feeding network is located in the accommodation space, and the second part 402 of the feeding network is located on the second surface of the reflection plate 20, heat generated by the radiating element 30 located in the accommodation space may also be conducted to the first part 401, and is transmitted to the outside from the second part 402 to increase a speed of heat dissipation in the accommodation space.

It should be noted that, treatments such as oxidation or spraying may be performed on a surface of the second surface of the reflection plate 20, to improve performance such as oxidation resistance and corrosion resistance of the reflection plate 20, thereby improving service life and reliability of the reflection plate.

In some possible embodiments, to improve a heat exchange speed between the accommodation space and the external space, the reflection plate 20 may be a metal reflection plate 20. In this way, the reflection plate 20 is a good conductor of heat. Because the second surface of the reflection plate 20 is not covered by the radome 10, the second surface of the reflection plate 20 is exposed to an outer side of the radome 10. Heat generated by the radiating element 30 in the accommodation space may be quickly conducted to the reflection plate 20, to prevent heat from accumulating inside the accommodation space, thereby effectively improving heat exchange efficiency between the reflection plate 20 and external air, and helping to improve heat dissipation efficiency of the radiating element 30.

Figure 2A:
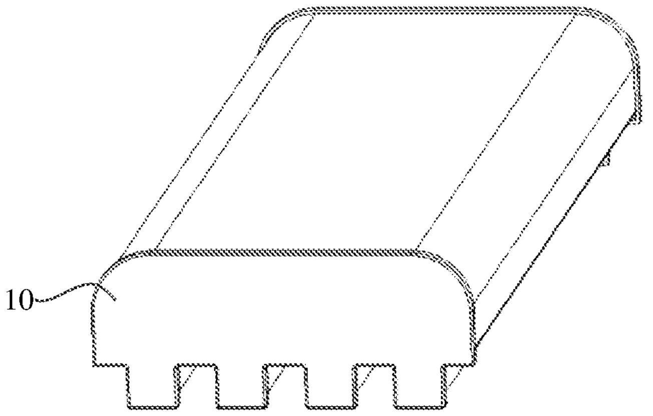
FIG. 2*a* is a schematic structural diagram of a separated radome in an antenna according to an embodiment of this application.
Figure 2B:
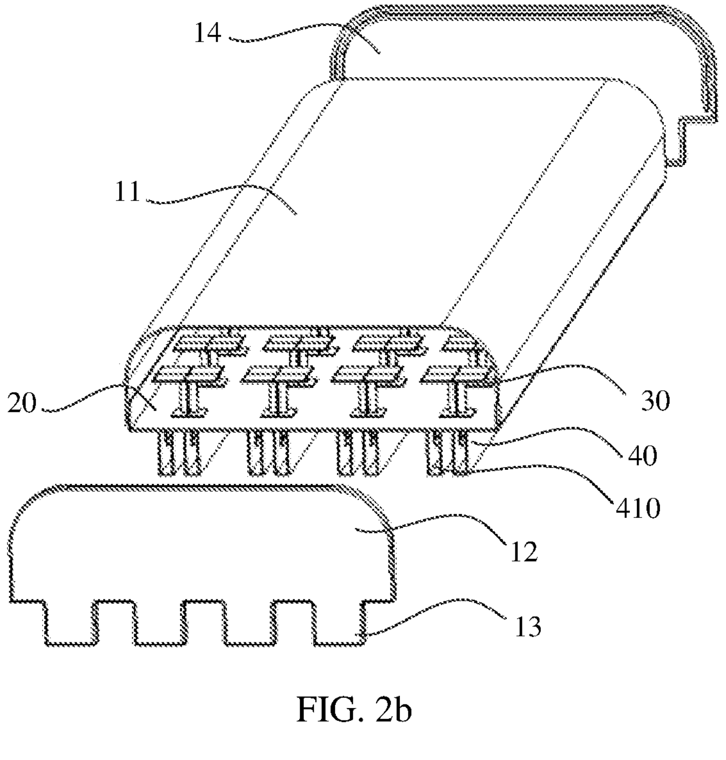
FIG. 2*b* is a schematic structural diagram of separation between a radome and an end cover in FIG. 2*a;*

In some possible implementations, refer to FIG. 2*a* and FIG. 2*b*, the radome 10 may include a main cover body 11, a first end cover 12, and a second end cover 14, where the main cover body 11, the first end cover 12, and the second end cover 14 may be an integrally disposed component that is integrally formed; or the first end cover 12, the second end cover 14, and the main cover body 11 are separated components. When the main cover body 11, the first end cover 12, and the second end cover 14 are integral components, the main cover body 11, the first end cover 12, and the second end cover 14 may be directly covered on the first surface of the reflection plate 20, and is enclosed with the first surface of the reflection plate 20 to constitute a closed accommodation space, the radiating element 30 is located in the accommodation space, and is disposed on the first surface of the reflection plate 20. The feeding network 40 is disposed on the second surface of the reflection plate 20; this disposing manner can improve convenience in which the radome 10 and the first surface of the reflection plate 20 constitute a closed accommodation space, and reduce time of disposing. When the main cover body 11 is disposed separately with the first end cover 12, and the second end cover 14, the main cover body 11 may be first cooperated with the reflection plate 20, so that the first surface of the main cover body 11 and the reflection plate 20 constitute an accommodation cavity with two ends open. The first end cover 12 and the second end cover 14 are respectively connected to the two ends of the main cover body 11, the first end cover 12 and the second end cover 14 correspond to the two openings of the accommodation cavity, so as to the first end cover 12, the second end cover 14, the main cover body 11, and the first surface of the reflection plate 20 constitute an accommodation space, and the radiating element 30 is located in the accommodation space. This disposing manner, the first end cover 12, the second end cover 14, and the main cover body 11 are connected in a detachable manner, so as to maintain and detect the radiating element 30 disposed in the accommodation space.

Figure 3:
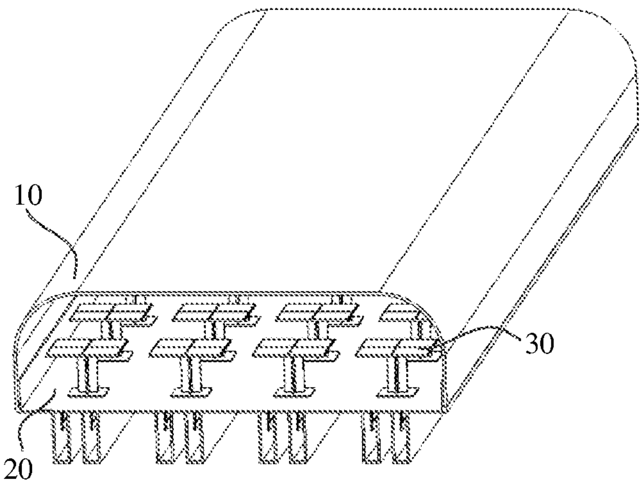
FIG. 3 is a schematic structural diagram of an antenna not showing an end cover according to an embodiment of this application.

In some possible implementations, refer to FIG. 3, to improve a capability of the antenna to radiate or receive an electromagnetic wave, a plurality of radiating elements 30 may be disposed in the accommodation space enclosed by the radome 10 and the reflection plate 20. The plurality of radiating elements 30 are all connected to the first surface of the reflection plate 20, and the plurality of radiating elements 20 may be distributed on the first surface of the reflection plate 20 in an array. Frequencies of the plurality of radiating elements 30 may be the same or different, and need to be adjusted according to actual requirements.

Figure 4:
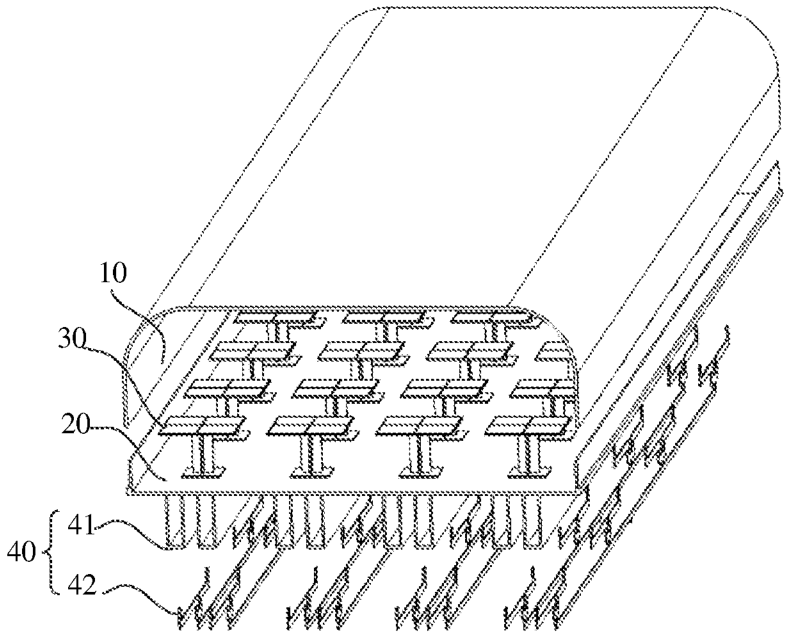
FIG. 4 is an exploded view of FIG. 3.

In some possible embodiments, refer to FIG. 4, a plurality of feeding networks 40 may be disposed, the plurality of feeding networks 40 may be evenly distributed on the second surface of the reflection plate 20, and each column of radiating elements 30 corresponds to one feeding network 40. Because a plurality of radiating elements 30 may be disposed, when the radiating elements 30 are connected to the reflection plate 20, the plurality of radiating elements 30 and the reflection plate 20 may constitute a plurality of independent arrays, and each array may receive and transmit electromagnetic signals through the radiating elements 30. The feeding network 40 is configured to process the signals. Specifically, the feeding network 40 may specifically include a housing 41 and a radio frequency transmission line component 42. The housing 41 is connected to the second surface of the reflection plate 20, and each housing 41 and the second surface of the reflection plate 20 constitute a cavity for accommodating the radio frequency transmission line component 42. The radio frequency transmission line component 42 is disposed in the cavity. The radio frequency transmission line component 42 may include one or more of a phase shifter, a transmission, a calibration network, a combiner, and a filter; the phase shifter is configured to perform phase shift on a signal that passes through the feeding network, to change a phase difference.

It should be noted that, the housing 41 and the reflection plate 20 may be integrally formed, and the housing 41 and the reflection plate 20 may also be separately disposed; when the housing 41 is specifically disposed, a cross section shape of the housing 41 may be U-shaped, V-shaped, semicircular, or elliptical. The housing 41 may also be in another shapes, which is not described herein.

Figure 5:
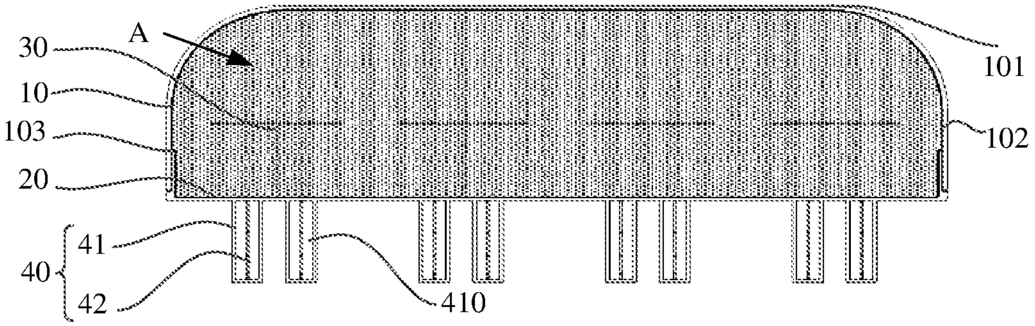
FIG. 5 is a main view of FIG. 3.
Figure 6:
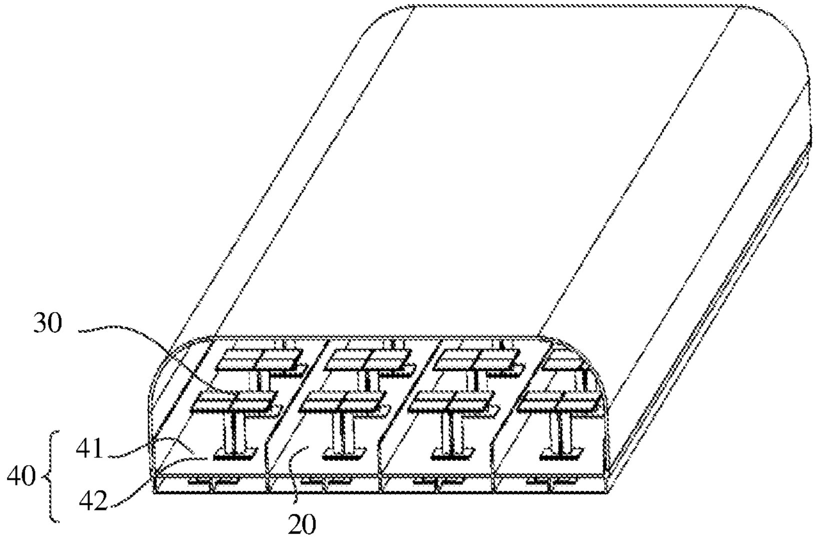
FIG. 6 is a schematic structural diagram of another antenna not showing an end cover according to an embodiment of this application.

Still refer to FIG. 5, the feeding network 40 corresponding to each column of radiating elements 30 includes two housings 41 and a radio frequency transmission line component 42 disposed in the two housings 41. The two housings 41 are disposed in parallel and do not contact each other. The housing 41 extends in a direction away from the second surface of the reflection plate 20, so as to the space of the cavity can adapt to the size of the radio frequency transmission line component 42, the radio frequency transmission line component 42 can vertically connected to the reflection plate 20, and heat generated by the radio frequency transmission line component 20 in the cavity may be quickly transferred to air through the housing 41. In some other possible embodiments, refer to FIG. 6 and FIG. 7, in the feeding network 40 corresponding to each column of radiating elements 30, the feeding network 40 includes two housings 41 and a radio frequency transmission line component 42 disposed in the two housings 41. The radio frequency transmission line component 42 may be disposed in parallel with the reflection plate 20, two housings 41 are connected to each other, and the two radio frequency transmission line components 42 are connected to connecting parts of the two housings 41, and are connected to the reflection plate 20 through the connecting parts; in this case, the housing 41 extends laterally (in a direction parallel to the reflection plate 20), to increase a contact area between the housing 41 and air, and ensure that heat generated by the radio frequency transmission line component 42 can be quickly transferred to air through the housing.

It should be noted that, when the radome 10 is specifically disposed, still referred to FIG. 5, the shadow region A in FIG. 5 is a cross section enclosed by the radome 10, and the cross section of the space enclosed by the radome 10 may be in a shape such as a semicircle, a rectangle, or an ellipse. Alternatively, when the radome 10 may include a first side plate 102, a second side plate 103, and a roof board 101, a connecting part between the first side plate 102, the second side plate 103, and the roof board 101 may be arc-shaped.

In some other embodiments, the feeding network 40 corresponding to each column of radiating elements may further include a housing and a radio frequency transmission line component. In this case, the radio frequency transmission line component may be directly connected to the reflection plate, and the radio frequency transmission line component is perpendicular to the reflection plate; or the radio frequency transmission line component may be disposed in parallel with the reflection plate, the radio frequency transmission line component is connected to the housing, and the housing is connected to the second surface of the reflection plate. In addition, the housing and the reflection plate can be integrally formed; or the housing and the reflection plate may be connected by means of riveting, screw connection, welding, clamping or the like. This is not specifically limited herein.

Figure 7:
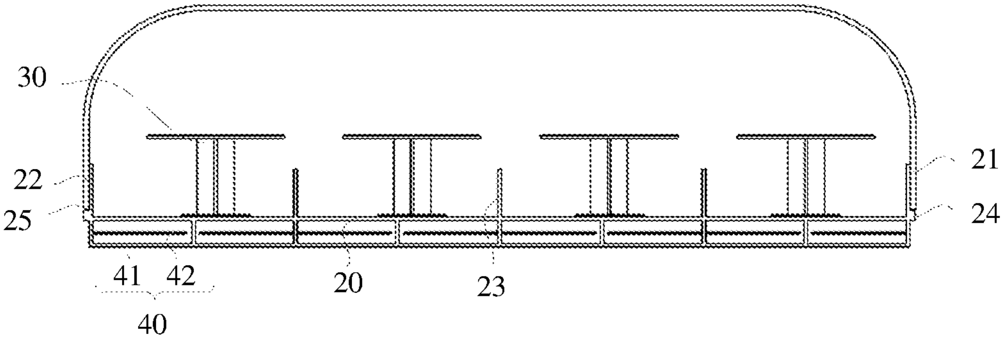
FIG. 7 is a main view of FIG. 6.

It should be noted that, with reference to FIG. 2*b* and FIG. 5, when the cavity constituted by the housing 41 and the second surface of the reflection plate 20 is an accommodation cavity 410 having two ends open, the accommodation cavity 410 includes a first opening and a second opening. To prevent impurities or water from entering the radio frequency transmission line component 42 disposed in the accommodation cavity 410, a plurality of first projecting portions 13 may be disposed on the first end cover 12, and a plurality of second projecting portions (not shown in the figure) may be disposed on the second end cover 14. The plurality of first projecting portions 13 and the plurality of second projecting portions extend to the second surface of the reflection plate 20, and away from the direction of the first surface, so as to the first projecting portions 13 can seal the first opening of the accommodation cavity 410, the second projecting portions can seal the second opening of the accommodation cavity 410, thus the plurality of first projecting portions 13, the plurality of second projecting portions and the accommodation cavity 410 constitute a closed space. When the radio frequency transmission line component 42 is perpendicular to the reflection plate 20, the housings 41 disposed outside the radio frequency transmission line component 42 are parallel to each other, and the two housings 41 are not in contact with each other, the plurality of first projecting portions 13 and the plurality of second projecting portions are disposed at intervals to correspond to the housings 41. The material of the first end plate 12 and the second end plate 14 can be saved; in this manner, when the first projecting portion 13 acts as a barrier, an air duct constituted between two adjacent housings 41 is not sealed, so as to heat dissipation efficiency of each housing 41 may be improved. In addition, to prevent impurities or water from entering the radio frequency transmission line component 42 disposed in the accommodation cavity 410, the first end cover 12 and the second end cover 14 may be integrally extended in a direction in which the second surface of the reflection plate 20 is far away from the first surface. The extensions of the first end cover 12 and the second end cover 14 are a whole plate, and the first opening and the second opening of the accommodation cavity 410 can be closed, so as to the first end cover 12, the second end cover 14, and the accommodation cavity 410 constitute a closed space. With reference to FIG. 2*b* and FIG. 7, when the radio frequency transmission line component 42 is parallel to the reflection plate 20, the housings 41 are sequentially connected, so as to each housing 41 constitutes a surface opposite to the reflection plate 20 on a side that is away from the reflection plate 20; in addition, to ensure that two ends of the housing 41 can be sealed, the plurality of first projecting portions 13 disposed on the first end plate 12 are sequentially connected to constitute a first whole plate, so as to seal one end of the housing 41; a plurality of second projecting portions disposed on the second end plate 14 are sequentially connected to constitute a second whole plate, so as to seal the other end of the housing 41. In this way, areas of the housing 41, the first projecting portion 13, and the second projecting portion contact with air are increased, so as to heat in the accommodation cavity constituted between the housing 41 and the reflection plate 20 can be quickly transferred to air. In addition, space utilization may be improved, and an antenna size may be reduced.

In some possible implementations, still refer to FIG. 7, to facilitate the radome to be covered on the reflection plate 20, the reflection plate 20 may include a main board body and a first baffle plate 21 and a second baffle plate 22 that are disposed on two sides of the main board body, where the first baffle plate 21 and the second baffle plate 22 are disposed in parallel. The first baffle plate 21 and the second baffle plate 22 extend along the length or width direction of the main board body, and are in the same extension direction as the radome roof board 101. The first baffle plate 21 and the second baffle plate 22 may cooperate with the radome; specifically, a plurality of open holes may be disposed on the first baffle plate 21 and the second baffle plate 22 respectively, and a through hole adapted to the plurality of open holes are disposed on the radome. In this case, the radome may be connected to the reflection plate 20 by using a bolt. To ensure sealing of the connection between the radome and the reflection plate 20, a sealing ring may be further disposed between the radome and the first baffle plate 21 and the second baffle plate 22; or a buckle is disposed on an outer sides of the first baffle plate 21 and the second baffle plate 22 or on the radome, and an opening for buckle fit is disposed on the radome or the first baffle plate 21 and the second baffle plate 22; moreover, the first baffle plate 21 and the second baffle plate 22 may be connected to the radome by welding. There may also be a plurality of manners of connecting the radome to the first baffle plate 21 and the second baffle plate 22. This is not specifically limited herein.

In a specific implementation process, a plurality of partition boards 23 may be further disposed on a metal plate 20, an extension direction of the partition board 23 is the same as the extension direction of the first baffle plate 21 and/or the second baffle plate 22, and the plurality of partition boards 23 are disposed between the first baffle plate 21 and the second baffle plate 22. In addition, the plurality of partition boards 23 are evenly distributed between the two first baffle plates 21, the partition board 23 and the first baffle plate 21 are disposed in parallel. At least one column of radiating elements 30 may be disposed between the two adjacent partition boards 23, and at least one column of radiating elements 30 may also be disposed between the partition board 23 and the first baffle plate 21, and between the partition board 23 and the second baffle plate 22.

It should be noted that, to improve convenience of connecting the radome to the reflection plate 20, a first boss 24 may be further disposed outside the first baffle plate 21, and a second boss 25 may be further disposed outside the second baffle plate 22. When the radome is installed on the reflection plate 20, the radome may first overlap on the first boss 24 and the second boss 25, and then connect the radome to the first baffle plate 21 and the second baffle plate 22 in a welding or detachable connection manner. A surface area of a side of the first boss 24 and the second boss 25 facing the radome may be greater than a thickness of the radome; and both the first boss 24 and the second boss 23 may include a plurality of segments, provided that the first boss 24 and the second boss 23 that are disposed in a plurality of segments are flush with a surface on one side of the radome.

In some possible implementations, the reflection plate may have a plurality of shapes, for example: the reflection plate may be disposed in V-shaped, U-shaped or W-shaped; when the reflection plate is disposed to V-shaped, the radiating element located on the first surface of the reflection plate may be disposed at the lowest part of the reflection plate and disposed along the extension direction of the lowest part of the V-shaped reflection plate, and the bottom of the radiating element is overlapped on two inclined planes of the reflection plate disposed in V-shaped; when the reflection plate is disposed to W-shaped, a radiating element may be disposed between two adjacent inclined planes, that is, a mount constituted by every two adjacent inclined planes. A quantity of radiating elements in each mount may be different, and frequencies of radiating elements in each mount part may be the same or be different.

It should be noted that, a shape of the reflection plate is not limited to V-shaped, U-shaped, or W-shaped, and the reflection plate may alternatively be in another shapes, which is not listed herein.

Figure 8A:
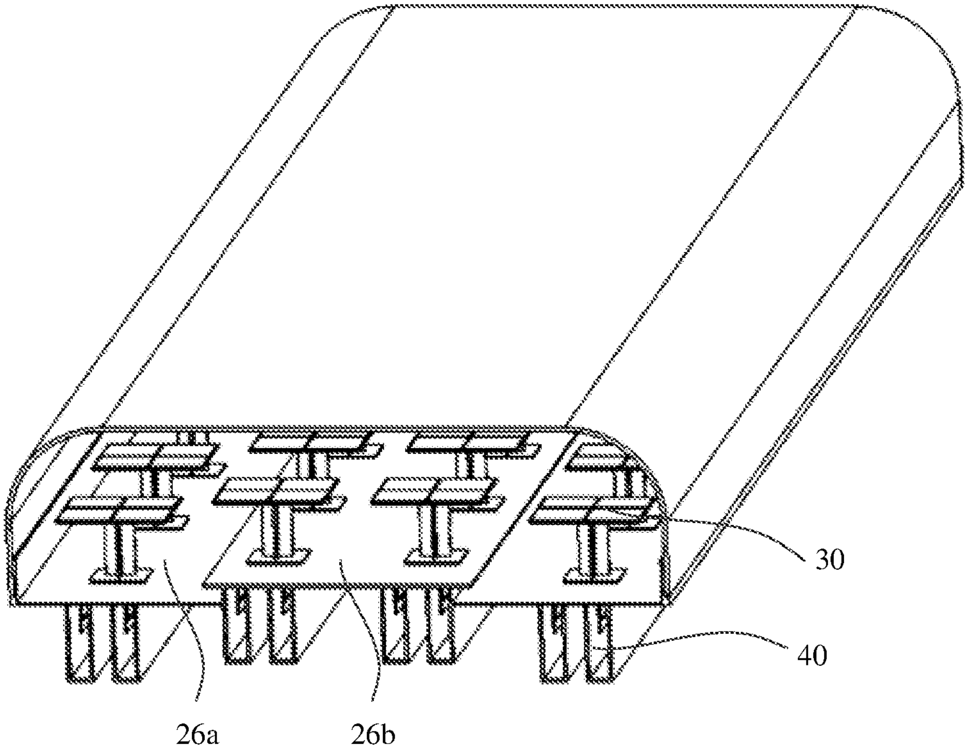
FIG. 8*a* is a schematic structural diagram of an antenna according to an embodiment of this application.
Figure 8B:
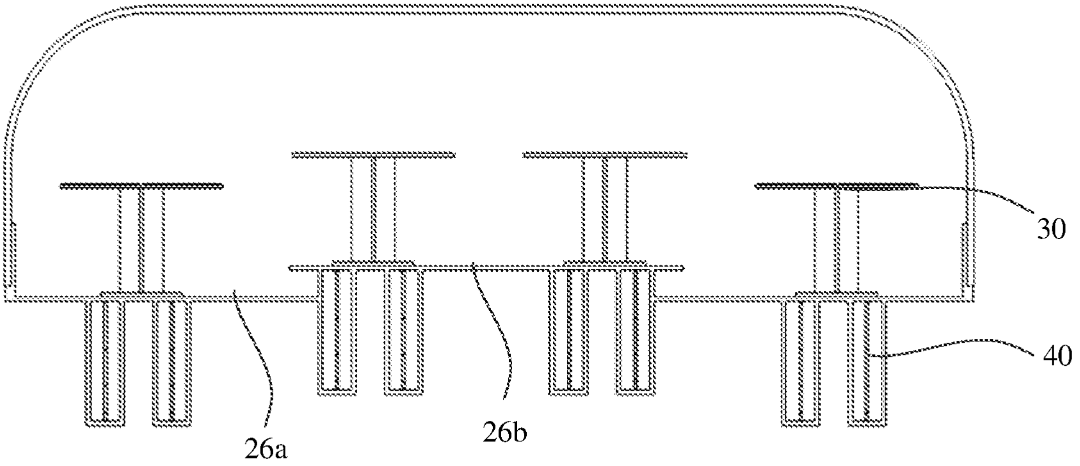
FIG. 8*b* is a main view of FIG. 8*a;*
Figure 9A:
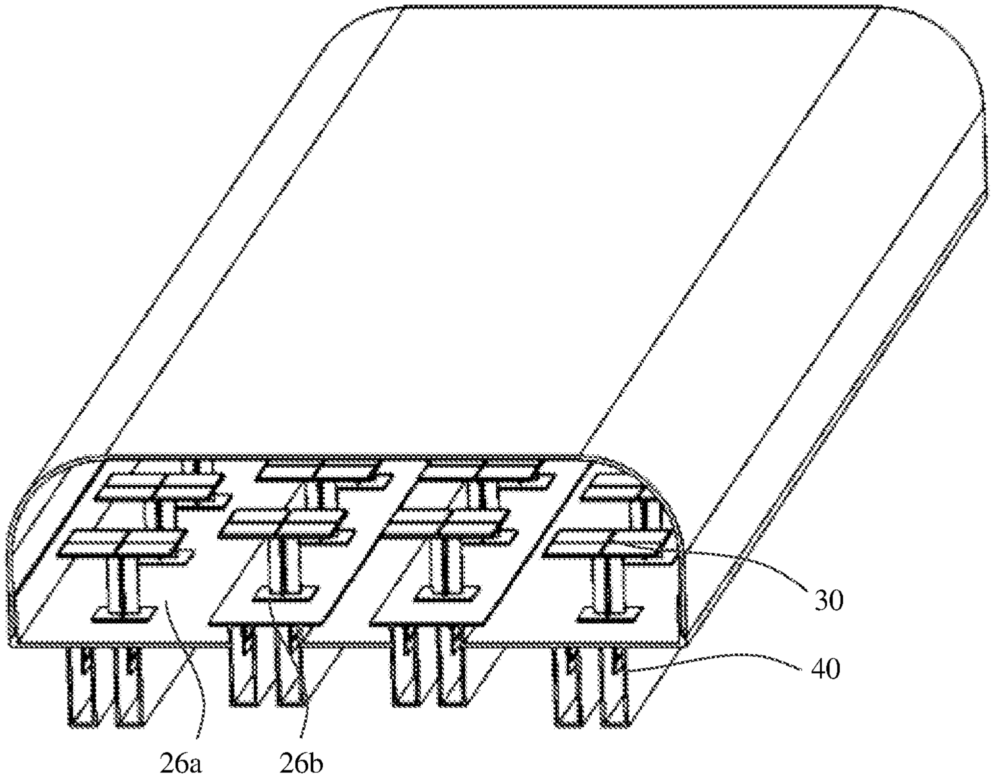
FIG. 9*a* is a schematic structural diagram of another antenna according to an embodiment of this application.
Figure 9B:
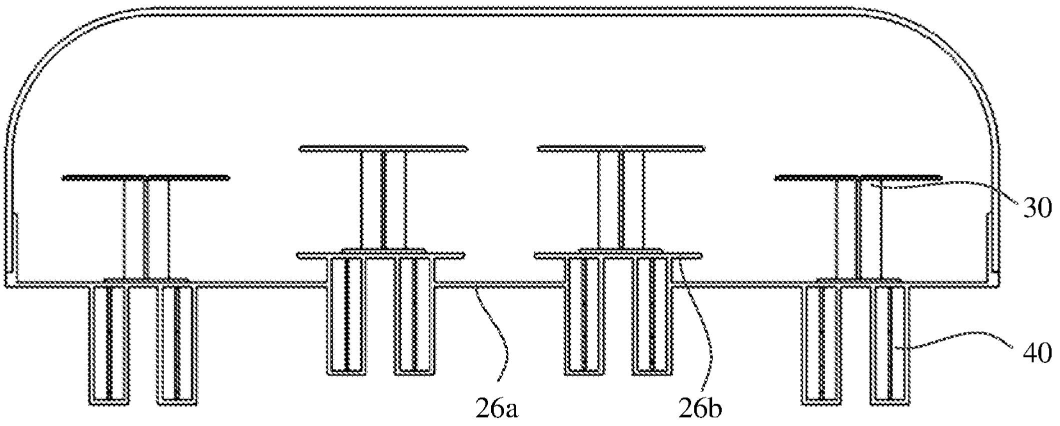
FIG. 9*b* is a main view of FIG. 9*a;*

In addition, refer to FIG. 8*a* and FIG. 8*b*, for example, the main board body may include a plurality of sub-board bodies 26*a* and a plurality of sub-board bodies 26*b* that are integrally formed, adjacent sub-board bodies 26*a* and 26*b* are located in different planes, and the sub-board body 26*a* and the sub-board body 26*b* are disposed with a radiating element 30 on one side of the accommodation space; the main board body may further include other sub-board bodies that are not on the same plane as the sub-board body 26*a* and 26*b*, which are not listed herein. In addition, the radiating element 30 disposed on the sub-board body 26*a* may be one column, and the radiating element 30 disposed on the sub-board body 2*b* may be two columns, and each column of radiating elements 30 is correspondingly disposed with a feeding network 40. Refer to FIG. 9*a* and FIG. 9*b*, the radiating element 30 disposed on the sub-board body 26*b* may be in one column. In an implementation, the radiating element 30 may not be disposed on the sub-board body 26*a* between two adjacent sub-board bodies 26*b* (this implementation is not shown in the figure).

Figure 10A:
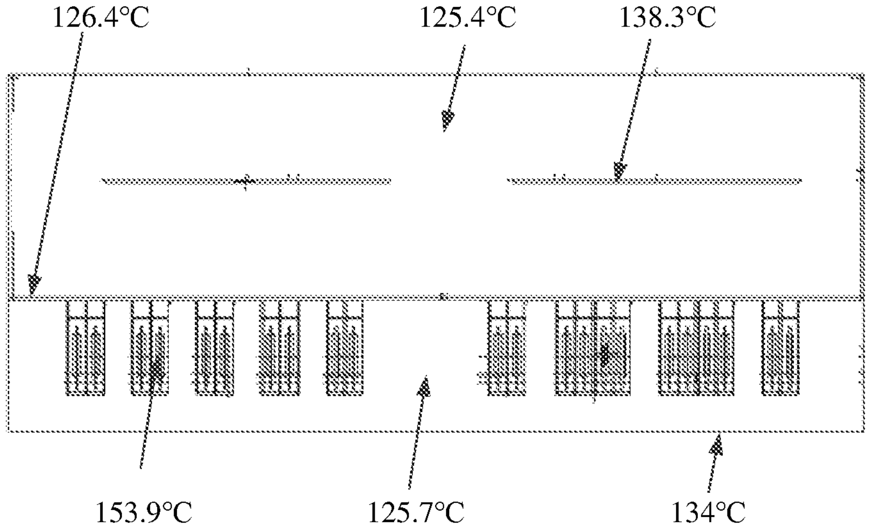
FIG. 10*a* is a thermal simulation diagram of a main view of an antenna in conventional technologies.
Figure 10B:
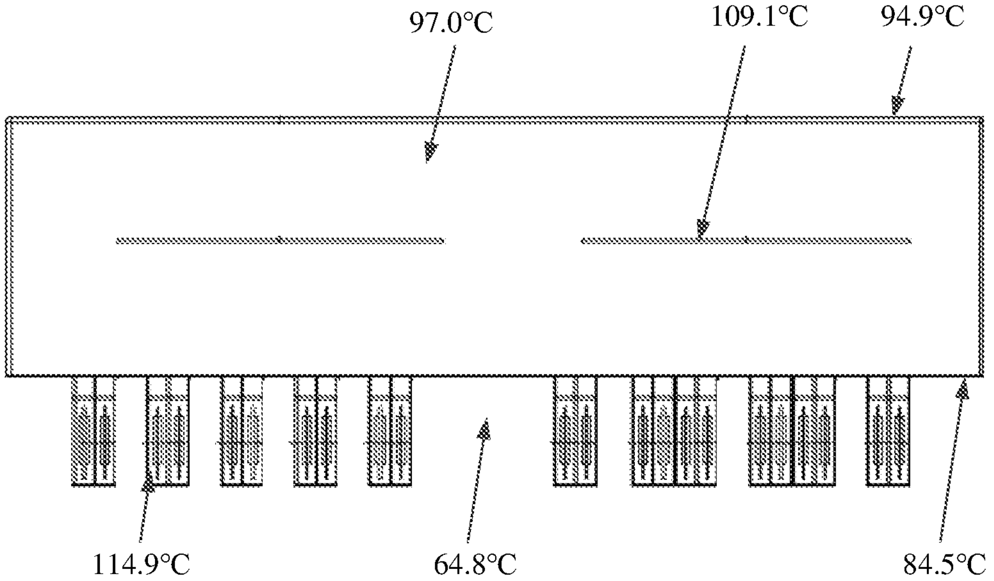
FIG. 10*b* is a thermal simulation diagram of a main view of an antenna according to an embodiment of this application.

Refer to FIG. 10*a* and FIG. 10*b*, heat dissipation status of an antenna in conventional technologies may be described by comparison with heat dissipation effect of an antenna in this application. Specifically, the following uses table 1 as an example. Table 1 shows an existing antenna with a length of 2 m and an input power of about 2000 W (the radome covers all heat dissipation components of the antenna-full cover structure) and an antenna provided in embodiments of this application (the radome covers part of the antenna and exposes the feeding network to the external environment, e.g., as shown in FIG. 1*e*) performing thermal simulation comparison, where air on a side (for example, the first surface in embodiments of this application) of the reflection plate on which the radiating element is disposed is defined as front air, and air on a side (for example, the second surface in embodiments of this application) of the reflection plate on which the feeding network is disposed is defined as back air. A temperature of back air of the existing antenna is 125.7° C. A back air temperature of the antenna provided in embodiments of the solution is 64.8° C., which is 60.9° C. less than a back air temperature of conventional technologies; the front air temperature of the existing antenna is 125.4° C., and the front air temperature of the antenna provided in embodiments of the solution is 97.0° C., which is 28.4° C. less than the front air temperature in conventional technologies; a temperature of the radiating element of the existing antenna is 138.3° C., and the temperature of the radiating element of the antenna provided in embodiments of this solution is 109.1° C., which is 29.2° C. less than the temperature of the radiating element of the existing antenna; a temperature of the reflection plate of the existing antenna is 126.4° C., and a temperature of the reflection plate of the antenna provided in embodiments of this solution is 84.5° C., which is 41.9° C. less than the temperature of a reflection plate of the existing antenna; a temperature of a medium of the existing antenna is 153.1° C., and a temperature of the medium of the antenna provided in embodiments of this solution is 114.1° C., which is 39.0° C. less than the temperature of the medium in conventional technologies; in conventional technologies, a temperature of a radio frequency transmission line component of the antenna is 153.9° C., and a temperature of the radio frequency transmission line component of the antenna provided in embodiments of this solution is 114.9° C., which is 39.0° C. less than the temperature of the radio frequency transmission line component in conventional technologies; in conventional technologies, a temperature of a housing of the antenna is 134° C., and a temperature of the housing of the antenna provided in embodiments of this solution is 94.9° C., which 39.1° C. less than the temperature of the housing in conventional technologies. It can be learned that, compared with conventional technologies, temperatures of the radiating element, the reflection plate, the radio frequency transmission line component, and the housing of the antenna in embodiments of this application are all reduced.

TABLE 1

| Thermal simulation/ ° C. | Antenna in conventional technologies | Antenna provided in embodiments of this solution | Benefits |
|---|---|---|---|
| Back air | 125.7° C. | 64.8° C. | 60.9° C. |
| Front air | 125.4° C. | 97.0° C. | 28.4° C. |
| Radiating element | 138.3° C. | 109.1° C. | 29.2° C. |
| Reflection plate | 126.4° C. | 84.5° C. | 41.9° C. |
| Medium | 153.1° C. | 114.1° C. | 39.0° C. |
| Radio frequency transmission line component | 153.9° C. | 114.9° C. | 39.0° C. |
| Housing | 134° C. | 94.9° C. | 39.1° C. |

In another aspect, this application further provides a base station. The antenna in the foregoing technical solutions is applied to the base station, so that when the base station works, a case in which heat inside the antenna cannot be dissipated, a temperature of a component inside the antenna is too high, and a temperature of a feeding network is too high does not occur.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna, comprising:

a reflection plate, wherein the reflection plate has a first surface and a second surface, and the first surface is opposite to the second surface;

a radome, wherein the radome covers the first surface of the reflection plate, and the radome and the reflection plate provide a closed accommodation space;

a radiating element located in the closed accommodation space; and a plurality of feeding networks at least partially disposed on the second surface, wherein the radiating element is electrically connected to a feeding network of the plurality of feeding networks, wherein the feeding network comprises a housing and a radio frequency transmission line component, wherein the housing is connected to the second surface, the housing and the second surface provide an accommodation cavity, and the radio frequency transmission line component is located in the accommodation cavity.

2. The antenna according to claim 1, wherein the reflection plate is a metal reflection plate.

3. The antenna according to claim 1, wherein the radome comprises a main cover body, a first end cover, and a second end cover, wherein the main cover body, the first end cover, the second end cover, and the first surface provide the closed accommodation space.

4. The antenna according to claim 3, wherein the reflection plate comprises a main board body, and a first baffle plate and a second baffle plate respectively disposed on two sides of the main board body, the first baffle plate and the second baffle plate are disposed in parallel, and the main cover body is separately connected to the first baffle plate and the second baffle plate.

5. The antenna according to claim 4, wherein a first boss is disposed on a side of the first baffle plate that is away from the second baffle plate, a second boss is disposed on a side of the second baffle plate that is away from the first baffle plate, and the main cover body is in contact with upper surfaces of the first boss and the second boss.

6. The antenna according to claim 4, wherein a plurality of radiating elements are distributed in the closed accommodation space in an array of rows and columns.

7. The antenna according to claim 6, wherein the reflection plate further comprises a plurality of partition boards, wherein an extension direction of the plurality of partition boards is the same as that of the first baffle plate, and at least one column of the plurality of radiating elements is disposed between the first baffle plate and a first partition board of the plurality of partition boards adjacent to the first baffle plate, the second baffle plate and a second partition board of the plurality of partition boards adjacent to the second baffle plate, or between two adjacent partition boards of the plurality of partition boards.

8. The antenna according to claim 6, wherein each column of the plurality of radiating elements is electrically connected to a corresponding feeding network of the plurality of feeding networks.

9. The antenna according to claim 8, wherein the accommodation cavity is a structure in which two ends pass through, and comprises a first opening and a second opening, and the first end cover is provided with a first projecting portion, the second end cover is provided with a second projecting portion, the first projecting portion is configured to block the first opening, and the second projecting portion is configured to block the second opening.

10. The antenna according to claim 9, wherein a cross-section of the reflection plate is U-shaped, V-shaped, or W-shaped.

11. The antenna according to claim 9, wherein:

the main board body is a flat plate; or the main board body comprises a plurality of sub-board bodies, two adjacent sub-board bodies of the plurality of sub-board bodies are located on different planes, and the plurality of radiating elements is disposed on a side of the plurality of sub-board bodies that is located in the closed accommodation space.

12. The antenna according to claim 9, wherein the first end cover and the second end cover, and the main cover body are integrally formed.

13. The antenna according to claim 9, wherein the first end cover and the second end cover are detachably connected to the main cover body.

14. The antenna according to claim 1, wherein the housing and the reflection plate are integrally formed.

15. The antenna according to claim 1, wherein a cross section of the housing is U-shaped, V-shaped, semicircular, or elliptical.

16. The antenna according to claim 1, wherein the plurality of feeding networks comprises a plurality of housings and a plurality of radio frequency transmission line components, wherein the plurality of housings comprises the housing and the plurality of radio frequency transmission line components comprises the radio frequency transmission line component, wherein each of the plurality of housings is connected to the second surface, each of the plurality of housings and the second surface providing an accommodation cavity housing a respective one of the plurality of radio frequency transmission line components.

17. The antenna according to claim 16, wherein the plurality of housings are disposed at discrete intervals.

18. The antenna according to claim 16, wherein the plurality of housings are disposed adjacent to each other.

19. A base station, comprising an antenna, wherein the antenna comprises:

a reflection plate, wherein the reflection plate has a first surface and a second surface, and the first surface is opposite to the second surface;

a radome, wherein the radome covers the first surface of the reflection plate, and the radome and the reflection plate provide a closed accommodation space;

a radiating element located in the closed accommodation space; and a plurality of feeding networks at least partially disposed on the second surface, wherein the radiating element is electrically connected to a feeding network of the plurality of feeding networks, wherein the feeding network comprises a housing and a radio frequency transmission line component, wherein the housing is connected to the second surface, the housing and the second surface provide an accommodation cavity, and the radio frequency transmission line component is located in the accommodation cavity.

20. The base station according to claim 19, wherein the reflection plate is a metal reflection plate.

* * * * *